United States Patent [19]

Lewis et al.

[11] 4,123,017
[45] Oct. 31, 1978

[54] DUAL, NON-CROSSING HORIZONTAL GATE TRACKING CIRCUIT AND METHOD

[75] Inventors: George R. Lewis, Maitland; Allen Fernandez, Orlando, both of Fla.

[73] Assignee: Martin Marietta Corporation, Orlando, Fla.

[21] Appl. No.: 88,089

[22] Filed: Nov. 9, 1970

[51] Int. Cl.$^2$ .................. F42B 15/10; F42G 7/10; F42B 15/00
[52] U.S. Cl. ........................... 244/3.16; 358/126
[58] Field of Search ............. 244/3.16, 3.17; 340/24, 340/25; 343/107; 358/126

[56] References Cited

U.S. PATENT DOCUMENTS

| 2,771,593 | 11/1956 | Strachl | 340/24 |
| 2,956,278 | 10/1960 | Branchu | 343/107 |

Primary Examiner—Samuel W. Engle
Assistant Examiner—Thomas H. Webb
Attorney, Agent, or Firm—Julian C. Renfro; Gay Chin

[57] ABSTRACT

(U) A dual gate tracker and method for controlling the flight path of a missile having television camera in the nose thereof. The two gates respectively track the right and left contrast edges of the target within the field of view of the camera and the target center is determined from a combination of these two signals. The deviation of the determined target center from the center of the field of view of the camer is utilized for missile control. Means are provided to prevent the tracking of the same contrast edge by the two gates and manual control of the gates may be established to position and/or enlarge the gates for target acquisition.

11 Claims, 11 Drawing Figures

FIG. 3 Display

FIG. 3A Display

FIG. 9
Yaw Averager

INVENTORS
GEORGE R. LEWIS
ALLEN FERNANDEZ
BY Julian C. Renfro
ATTORNEY

FIG. 2
System

FIG. 4 Video Processor & AGC

FIG. 5 Mode Control

FIG. 10 Restraint

DUAL, NON-CROSSING HORIZONTAL GATE TRACKING CIRCUIT AND METHOD

BACKGROUND OF THE INVENTION

The present invention relates to a dual gate tracker and method and more specifically a dual gate tracker utilized in a guided missile control system.

Systems for tracking an object within a field of view are well known in the art. Such systems customarily employ a television camera or other means for generating an electronic signature of the object within the field of view. This electronic signature is generally differentiated to accent any change in contrast and the movement of this edge or contrast change within the field of view of the camera is utilized for tracking and/or control purposes. Such systems are known as single gate trackers and are very effective where the object tracked is quite small relative to the field of view of the camera.

Problems, however, arise when the object tracked is large for the reason that the point of contrast, i.e., the edge of the target, may be displaced a considerable distance from the center thereof due either to the physical size of the target or the proximity of the camera thereto. The signal related to target position thus generated, while not erroneous as to the edge of the target, may be entirely unsatisfactory for the desired control purpose. For example, the delivery of a missile on the extreme edge of a large target such as a tank, marine vessel, or the like, may not only allow the target to avoid destruction but escape without substantial injury.

This single edge tracking problem is more acute where, as in the case of a vessel under way, the point of contrast tracked by the apparatus may not in fact be the stern of the ship but may be the contrast of the wake of the vessel relative to the sea, resulting in the delivery of the missile into the water astern of the vessel.

It is accordingly an object of the present invention to obviate the deficiencies of these known prior art systems and to provide a novel method and apparatus for the centroid tracking of a target within a field of view.

It is another object of the present invention to provide a novel method and apparatus for tracking the center of a target by averaging the tracking signals from dual gates.

It is still another object of the present invention to provide a novel method and apparatus for dual gate tracking including means to prevent the collapsing of the dual gates into a single gate.

It is yet another object of the present invention to provide a novel method and means for controlling the flight of a guided missile.

It is yet still another object of the present invention to provide a novel method and means for tracking the opposing contrast edges of a target and for generating an error signal responsive thereto.

These and other objects and advantages will be apparent to one skilled in the art to which the invention pertains from the claims and from the following detailed description of a preferred embodiment when read in conjunction with the appended drawings.

THE DETAILED DESCRIPTION

An understanding of the method and system of the present invention may be gained from the detailed description of a preferred embodiment which follows in accordance with the following:

TABLE OF CONTENTS

A. System Description and Operation (FIGS. 1-3)
B. Video Processor and AGC (FIG. 4)
C. Mode Control (FIG. 5)
D. Tracker (FIGS. 6-8)
E. Averager (FIG. 9)
F. Restraint (FIG. 10)

A. System Description and Operation.

Figure 1:
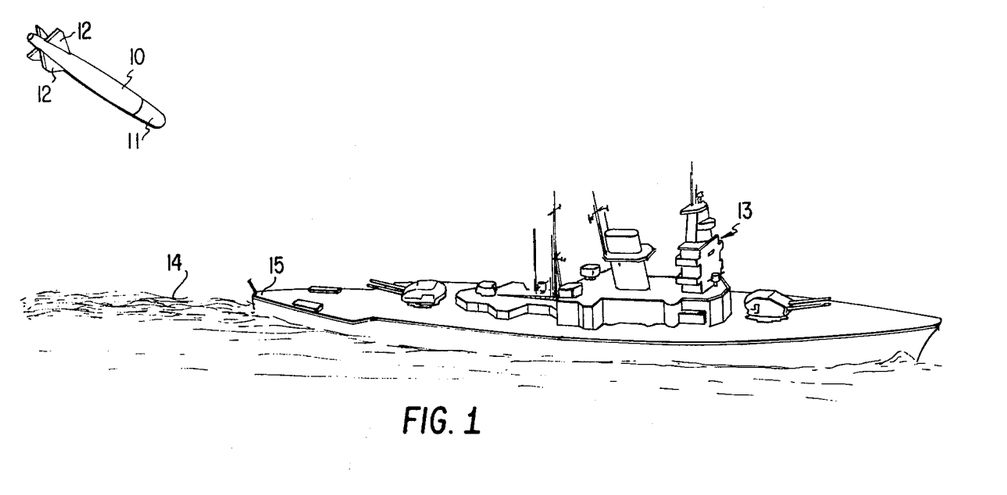
FIG. 1 is a pictorial view of a missile controlled in accordance with the present invention.

FIG. 1 is a pictorial representation of a missile 10 in flight towards a target vessel 13. In accordance with the system of the present invention, the missile 10 includes a television camera within a nose portion 11 and is controlled in flight by a plurality of control surfaces 12. The type of missile is immaterial to the operation of the present invention as is the method by which the flight path of the missile may be modified. For example, the missile 10 may or may not be self-propelled, and reaction motors may be utilized in lieu of the control surfaces such as the ailerons 12 illustrated.

As earlier explained, a single gate tracking system may lock onto an extreme edge of the target or, in the event that the target is a vessel 13 as illustrated, on the wake 14 thereof. This can cause the missile to impact on the fantail 15 of the vessel or in the water aft thereof. By the utilization of the dual gate tracker of the present invention, both forward and rearward contrast edges of the target vessel 13 are detected and the flight of the missile 10 modified to achieve impact near the center of the vessel 13 for maximum effectiveness.

Figure 2:
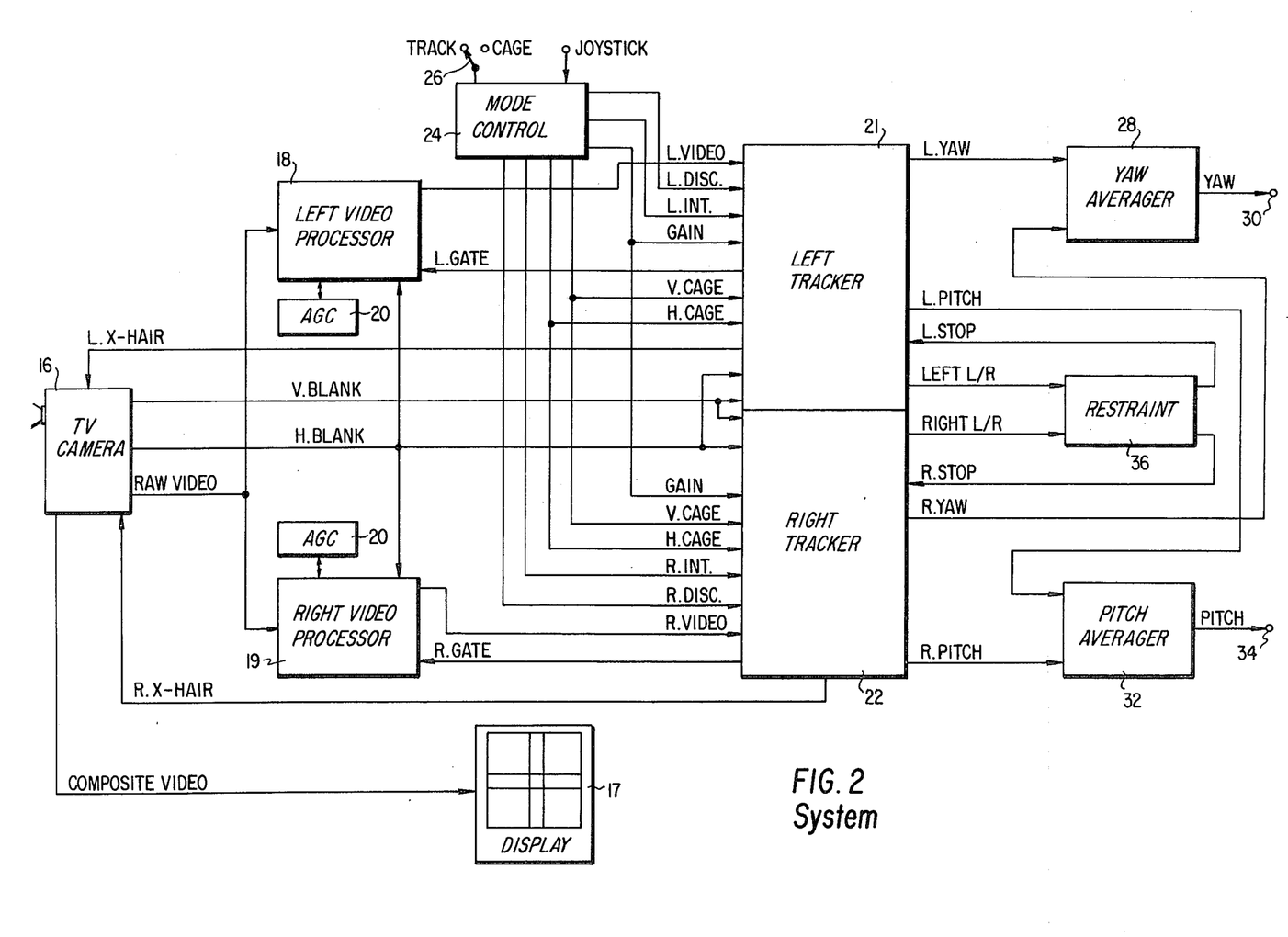
FIG. 2 is a block diagram of the preferred embodiment of the system of the present invention.

With reference now to FIG. 2, a television camera 16 is utilized to produce the electronic signature of a target within a field of view. The camera 16 may be conventional both in circuitry and operation and operable to produce a non-composite RAW VIDEO signal, a horizontal blanking or H. BLANK signal and a vertical blanking or V. BLANK signal. The camera 16 may in addition produce, when supplied with right and left cross-hair signals, R. X-HAIR and L. X-HAIR subsequently to be described, a COMPOSITE VIDEO signal to be displayed in a conventional manner in a suitable conventional display 17 such as that hereinafter described more fully in connection with FIG. 3.

The RAW VIDEO signal from the camera 16 is supplied to a Left Video Processor 18 and to a Right Video Processor 19, each of which is automatically controlled in gain by an AGC circuit 20. Both the left video processor 18 and the right video processor 19 are additionally supplied with the H. BLANK signal from the camera 16 and each receives the appropriate one of the gating signals L. GATE and R. GATE from the left and right tracker circuits 21 and 22. The video processor and AGC circuits are hereinafter described more fully in connection with FIG. 4. The video processors 18 and 19 accept the RAW VIDEO signal, automatically adjust the gain thereof, and gate the appropriate portions thereof to the associated tracker circuits 21 or 22. The left video (L. VIDEO) signal is directed to Left Tracker 21, and the right video (R. VIDEO) signal is directed to Right Tracker 22.

A mode control circuit 24 is provided and is responsive to a JOY STICK signal and either a TRACK or CAGE signal by way of a selector switch 26. The mode control circuit 24 is described more completely in connection with FIG. 5 and supplies to the left tracker circuit 21 the left discriminator L. DISC. signal, the left integrator or L. INT. signal, a GAIN signal, a vertical cage or V. CAGE signal and a horizontal cage or H. CAGE signal. Similar signals are supplied by the mode control circuit 24 to the right tracker circuit 22. The left tracker circuit 21 and right tracker circuit 22 may be identical and are described in more detail in connection with FIG. 6. As earlier explained, each of the tracker circuits 21 and 22 is provided with respective video signal L. VIDEO or R. VIDEO from the associated video processors 18 or 19 and are operable to provide the cross-hair signals L. X-HAIR and R. X-HAIR to the camera 16 for subsequent utilization in the display 17.

The left tracker circuit 21 provides a left yaw or L. YAW signal to a yaw average circuit 28 which also receives a right yaw or R. YAW signal from the right tracker circuit 22. The YAW output signal from the yaw averager circuit 28 is available on an output terminal 30 for control purposes such as the positioning of ailerons, reaction motors, or the like.

A left pitch or L. PITCH signal is also supplied by the left tracker circuit 21 to a pitch averager circuit 32. The pitch averager circuit 32 also receives a right pitch or R. PITCH signal from the right tracker circuit 22 and provides a PITCH output signal on the system output terminal 34 for control purposes.

Figure 9:
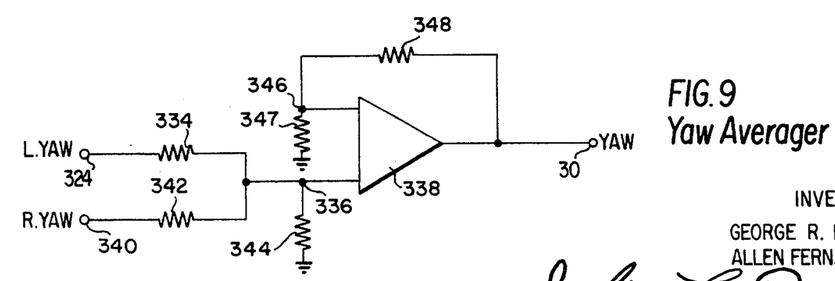
FIG. 9 is a schematic circuit diagram of the yaw averager circuit of FIG. 2.
Figure 10:
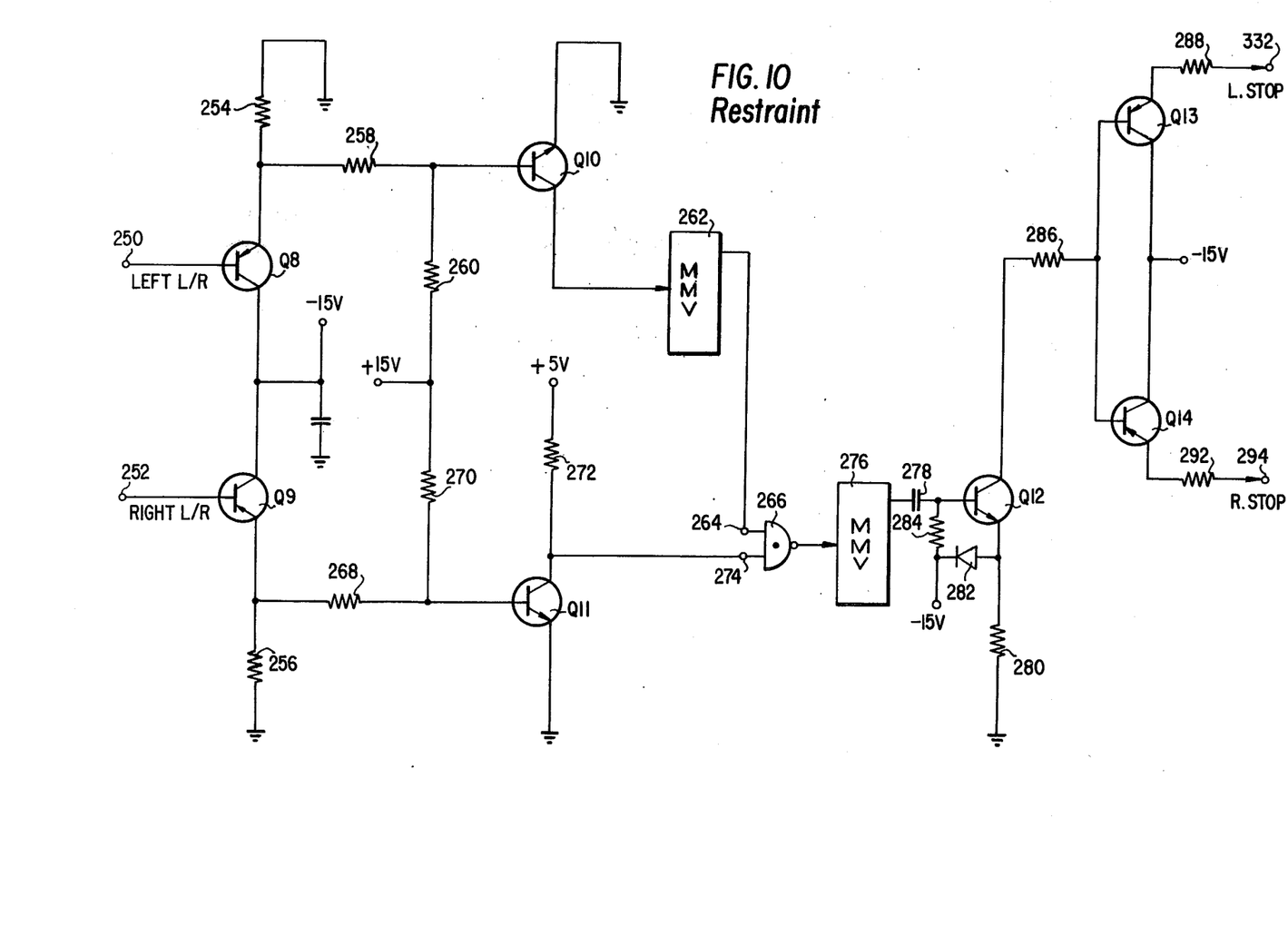
FIG. 10 is a schematic circuit diagram of the restraint circuit of FIG. 2.

The yaw averager circuit 28 and the pitch averager circuit 32 may be identical and a suitable circuit is illustrated in FIG. 9, hereinafter described in greater detail.

The left and right tracker circuits 21 and 22 additionally provide LEFT L/R and RIGHT L/R signals, respectively, to a restraint circuit 36. The restraint circuit 36 in turn generates left and right stop or L. STOP and R. STOP signals which are supplied, respectively, to the left and right tracker circuits 21 and 22. This limits the flow of cross-hair signals L. X-HAIR and R. X-HAIR supplied to the camera 16 as well as the yaw and pitch signals L. YAW, R. YAW, L. PITCH and R. PITCH supplied to the averager circuits 28 and 32. The restraint circuit 36 is hereinafter described in greater detail in connection with FIG. 10.

Figure 3:
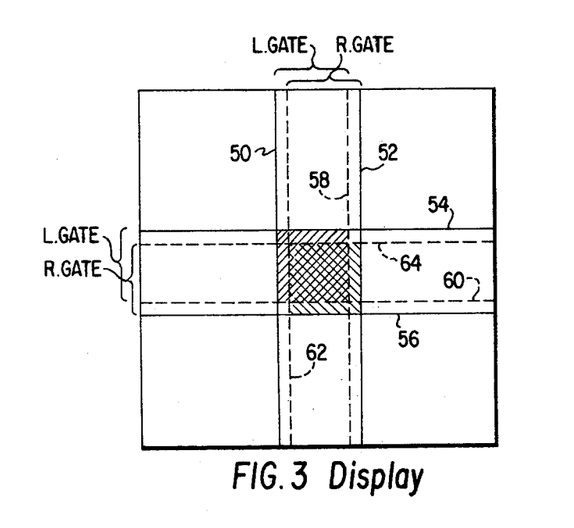
FIG. 3 is a pictorial view in elevation of the display of FIG. 2.

An understanding of the operation of the system may be gained from reference to FIG. 3 where the display of FIG. 2 is illustrated. An optical reticle is formed by lines 50, 52, 54 and 56 displayed on the face of the display unit which may be, for example, a conventional cathode ray tube in which the reticle is electronically generated. In the caged mode, as determined by mode control circuit 24 of FIGS. 2 and 5, a left gate is formed by lines 50, 58, 60 and 54. The lines 60 and 58, however, are not displayed in the interest of clarity. The area of the left gate is cross-hatched diagonally upwardly to the right in the drawing for illustrative purposes. A right gate is bounded by the lines 62, 64, 52 and 56 and the area encompassed thereby is cross-hatched diagonally downwardly to the right in the drawing for purposes of illustration. The lines 62 and 64 are also not displayed to simplify the display.

If the initial target size is smaller than the minimum permissible spacing between lines 58 and 62, the gates would tend to track the same edge or contrast point and collapse the system into a single gate tracker. The restraint circuit 36 of FIGS. 2 and 10 is operative to maintain a minimum gate separation, thus preventing the tracking of a single contrast edge. With range closure and expansion of the target size, the left gate will maintain a lock on the left contrast edge of the target and the right gate will lock onto the right contrast edge of the target. These two gates will maintain a lock on their respective contrast edges during range closure and separate horizontally and vertically, as required by the increased target size. Gate error signals are generated and relate to the distance of the contrast edge from the center of the display. Control signals are generated responsive to the two gate error signals and may be utilized for guidance of the system towards the target center.

As will hereinafter be described, joy stick control permits the system operator to manually position the tracking gate reticles about an observed target by the positioning of a conventional joy stick. Further, as will be described, the gate separation may be manually expanded by the system operator until the horizontal separation of the gates matches the horizontal target size.

Thus, the RAW VIDEO signal from the camera 16 is applied to the left processor 18 and a portion thereof gated as the L. VIDEO signal to the left tracker circuit 21 under control of the L. GATE signal therefrom. Assuming that the system operator has placed the left tracker 21 in the track mode by means of the mode control circuit 24, the left tracker circuit generates the L. YAW and L. PITCH signals to be averaged with similar signals from the right tracker circuit 22 in the yaw and pitch averager circuits 28 and 32 to produce the YAW and PITCH control signals.

Minimum separation of the gates, as determined by the L. GATE and R. GATE signals and displayed by means of the L. X-HAIR and R. X-HAIR signals, is maintained by the restraint circuit 36 to prevent the collapsing of the gates into a single gate.

Figure 3A:
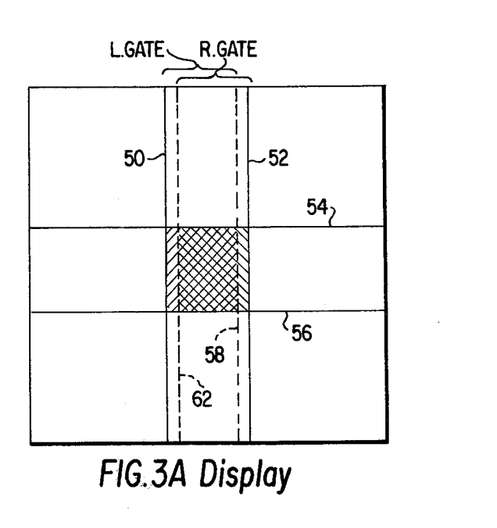
FIG. 3A is a pictorial view in elevation of the display of FIG. 2 with the system in the "caged" mode.

As shown in FIG. 3A, the left and right gates completely overlap in the vertical direction and partially overlap in the horizontal direction when the system is in the "caged" mode. As in FIG. 3, the dashed lines are not displayed.

B. Video Processor

Figure 4:
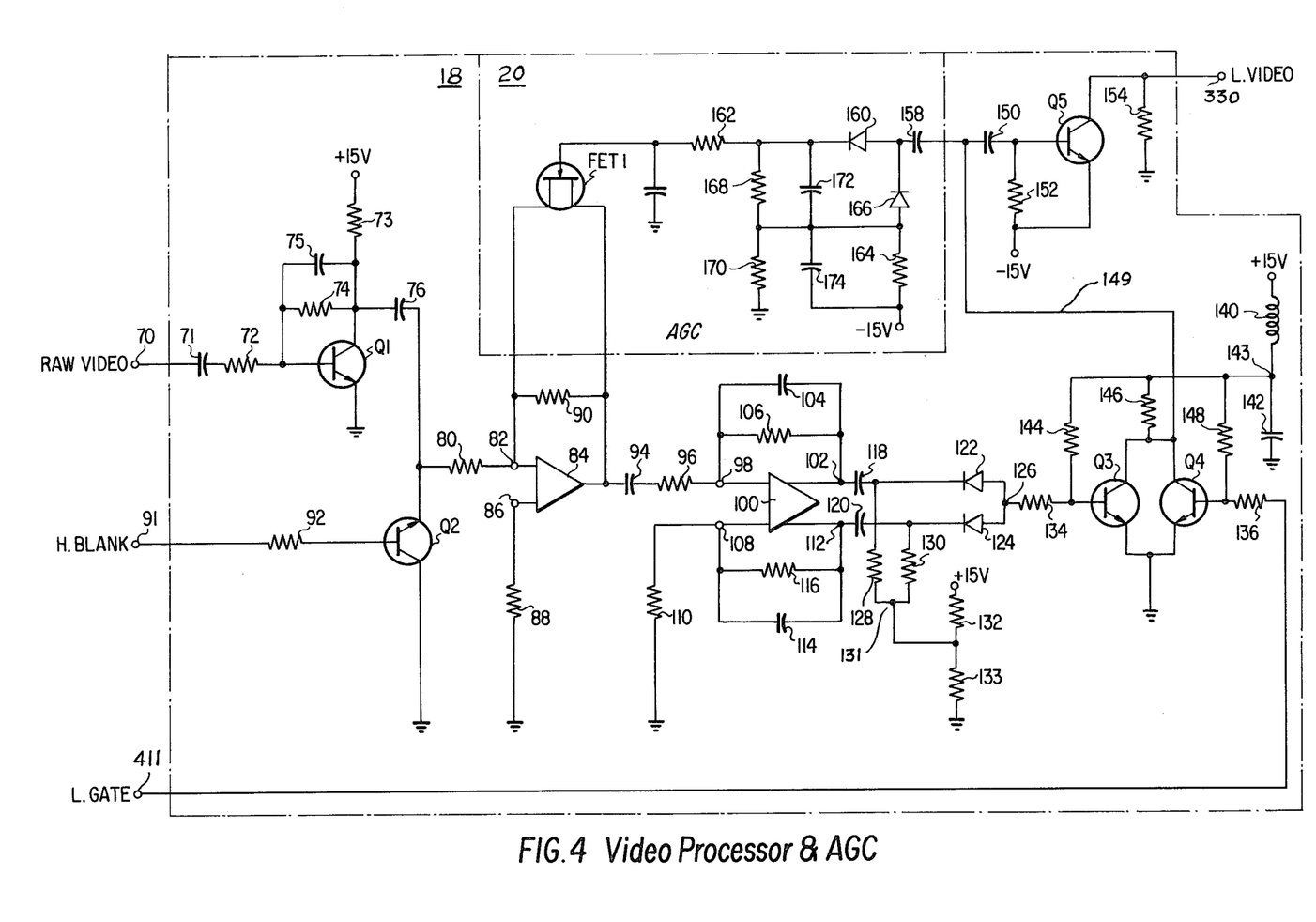
FIG. 4 is a schematic circuit diagram of the left video processor and automatic gain control circuits of FIG. 2.

With reference now to the left video processor circuit 18 and automatic gain control circuit 20 illustrated in FIG. 4, the RAW VIDEO signal from the television camera 16 is applied to an input terminal 70 of the video processor 18. This signal is applied by way of a capacitor 71 and a resistor 72 to the base electrode of an NPN transistor Q 1. The emitter electrode of the transistor Q 1 is grounded and the collector electrode is biased from a source of positive 15 volt potential through a resistor 73. The collector electrode is coupled to the base electrode by a resistor 74 and capacitor 75 in parallel.

The transistor Q 1 circuit thus functions as a differentiator and the output signal taken from the collector electrode, and is applied through a capacitor 76 and a resistor 80 to an input terminal 82 of a conventional operational amplifier 84. The other input terminal 86 of the operational amplifier 84 is grounded through a resistor 88 and the output signal of the amplifier 84 fed back through a resistor 90 to the input terminal 82. The differentiated non-composite video signal applied to the amplifier 84 may be shunted to ground through a resistor 92 and an NPN transistor Q 2 under the control of the H. BLANK signal from the camera 16 as applied by way of an input terminal 91, this arrangement being utilized so as to make possible the elimination of false targets.

The output signal from the amplifier 84 is applied through a capacitor 94 and a resistor 96 to an input terminal 98 of a suitable conventional differential amplifier 100. The output terminal 102 of the amplifier 100 is connected to the input terminal 98 through a capacitor 104 and resistor 106 in parallel. The other input terminal 108 of the amplifier 100 is grounded through a resistor 110 and the other output terminal 112 of the amplifier 100 is connected to the input terminal 108 through a capacitor 114 and resistor 116 in parallel.

The complimentary signals appearing on the output terminals 102 and 112 of the amplifier 100 are applied, respectively, through capacitors 118 and 120 and diodes 122 and 124 to a summing junction 126. The diodes 122 and 124 are poled so as to pass only negative signals and the cathodes of the diodes 122 and 124 are connected, respectively, through resistors 128 and 130 to a point 131, which in turn is connected to a suitable source of positive 15 volt d.c. potential and ground by way of resistors 132 and 133, respectively.

The summing junction 126 is connected by way of a resistor 134 to the base electrode of an NPN transistor Q 3 in a common grounded emitter configuration with an NPN transistor Q 4. The base electrode of the transistor Q 4 is connected through a resistor 136 to an input terminal 411 to which is applied the L. GATE signal from the left tracker 21 of FIGS. 2 and 6. The base and collector electrodes of the transistors Q 3 and Q 4 are biased from a source of positive 15 volt d.c. potential as taken from the inductor 140 — capacitor 142 junction 143 and applied through resistors 144, 146 and 148.

The output signal from the transistorso Q 3 and Q 4 is taken from the collector electrodes thereof and is applied through a capacitor 150 to the base electrode of an NPN transistor Q 5. The emitter and base electrodes of the transistor Q 5 are biased respectively from a source of negative 15 volt d.c. potential directly and through a resistor 152. The collector electrode of the transistor Q 5 is connected across a resistor 154 to an output terminal 330 of the video processor circuit 18 and provides the L. VIDEO output signal to the left tracker circuit 21 of FIG. 2.

With continued reference to FIG. 4, the output signal of the transistors Q 3 and Q 4 is also fed back via lead 149 through the AGC circuit 20 to vary the impedance of the feedback path of the amplifier 84 earlier described. More specifically, the output signal from transistors Q 3 and Q 4 output signal is applied through a capacitor 158, a diode 160 and a resistor 162 to the control electrode of a field effect transistor FET-1. The transistor FET-1 is connected as a variable impedance across the resistor 90 to adjust the impedance in the feedback path of the amplifier 84 circuit in dependency upon the degree of conduction. The capacitor 158 and diode 160 junction is biased from a source of negative 15 volt potential by way of a resistor 164 and a diode 166. The cathode of the diode 166 is connected to ground through a pair of resistors 168 and 170 and to the negative 15 volt source through a pair of capacitors 172 and 174. The resistor 168 and 170 junction is directly connected to the capacitor 172-174 junction and to the diode 166 and resistor 164 junction.

In operation, the RAW VIDEO signal applied to the input terminal 70 of the processor 18 is differentiated to accentuate the points of contrast contained therein. Unless blanked by the H. BLANK signal applied to the input terminal 91 of the video processor 18, this differentiated signal is amplified and then applied to the base electrode of transistor Q 3. The absence of the negative L. GATE signal on the input terminal 411 of the video processor 18 renders transistor Q 4 conductive thereby grounding the output signal from the amplifier 100 to the transistor Q 5. In the presence of the negative L. GATE signal, transistor Q 4 is non-conductive and transistor Q 3 further amplifies the output signal from the amplifier 100 to provide an input signal to the transistor Q 5.

Thus, the absence of an L. GATE signal effectively insures the absence of an output signal on the output terminal 330. The output signal appearing on the output terminal 330 is a 0 to negative 15 volt pulse(s) typically about 4 microseconds in duration corresponding to a point(s) of contrast with the left gate. The presence of the negative L. GATE signal insures a 0 to negative 15 volt L. VIDEO output signal on the terminal 330 when there is a contrast edge inside the left gate.

The input signal to the transistor Q 5 is also fed back through the AGC circuit 20 where it is applied to the control electrode of the transistor FET-1. The transistor FET-1 acts as a variable impedance to reduce the gain of the amplifier 84 with an increase in the signal strength of the RAW VIDEO.

C. Mode Control

Figure 5:
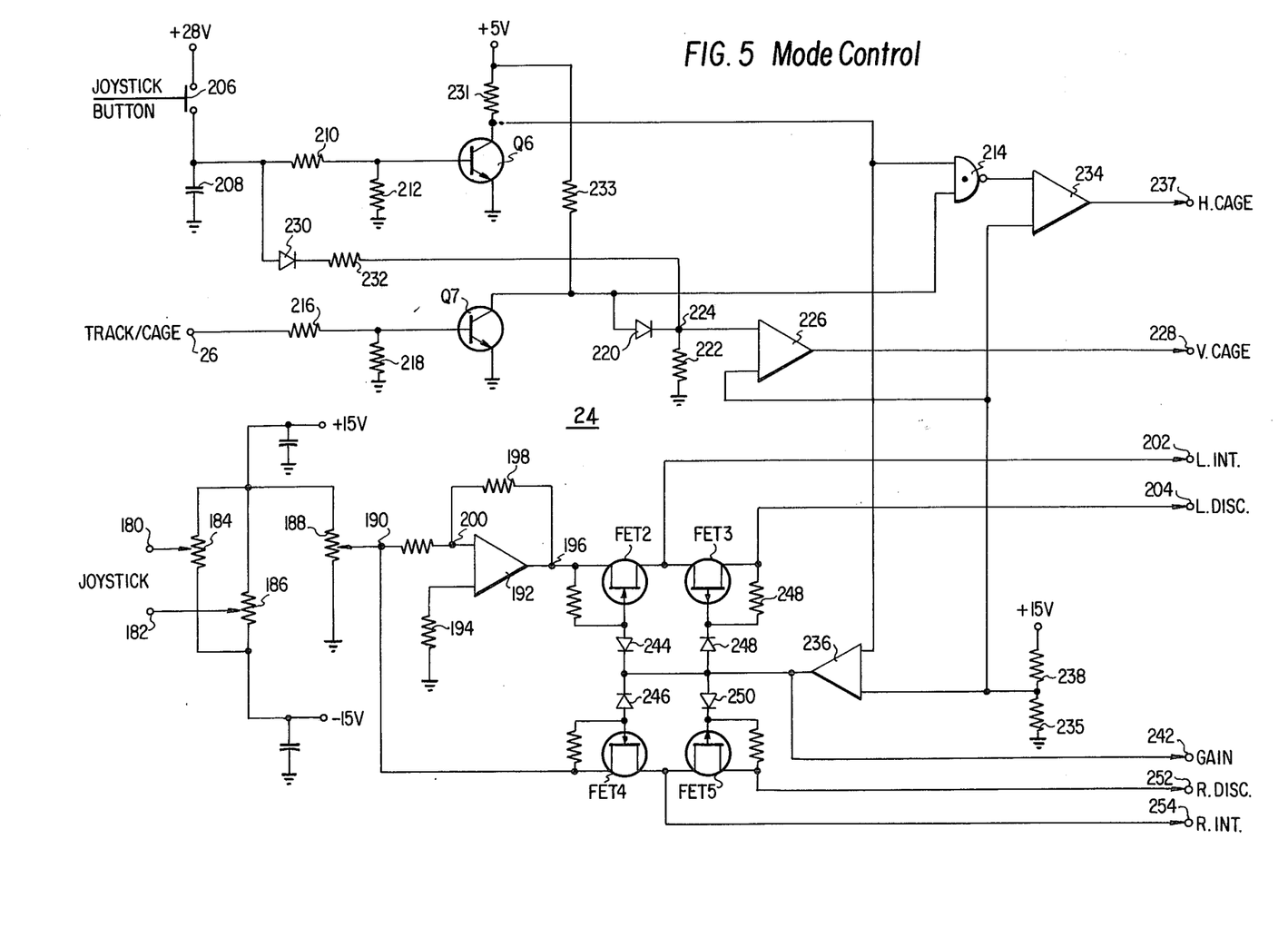
FIG. 5 is a schematic circuit diagram of the mode control circuit of FIG. 2.

With reference now to FIG. 5 where the mode control circuit 24 of FIG. 2 is illustrated, servo signals are generated through manual operation of the joy stick by the system operator through the responsive movement of the contact arms 180 and 182 of potentiometers 184 and 186. The generation of the servo signals is conventional and the signals are utilized to aim the camera 16 of FIG. 2. The contact arm 190 of a potentiometer 188 may be manually positioned by the system operator to expand the gates in the acquisition of a target larger than the minimum gate separation of the caged system.

The output signal from the joy stick control is inverted in a conventional operational amplifier 192 having one input terminal grounded through a resistor 194 and the output terminal 196 connected through a feedback resistor 198 to the other input terminal 200. This inverted signal is applied to the drain electrode of an N-channel field effect transistor FET-2. The source electrode of the transistor FET-2 is directly connected to an output terminal 202 of the mode control circuit 24 to provide the L. INT. and to the source electrode of a P-channel field effect transistor FET-3. The drain electrode of the transistor FET-3 is connected to output terminal 204 of the mode control circuit to provide the L. DISC. signal to the left tracker circuit 21 of FIGS. 2 and 6.

Also available on the joy stick is a button control illustrated schematically as switch 206 which is operable to connect a source positive 28 volt d.c. potential across a capacitor 208. The voltage on the capacitor 208 is applied through a resistor 210 to the base electrode of an NPN transistor Q 6. The capacitor 208 voltage is also applied through a diode 230 and resistor 232 to an input terminal 224 of a conventional comparator amplifier 226.

The emitter electrode of the transistor Q 6 is grounded and the collector electrode is connected to a source of positive 5 volt d.c. potential through a resistor 231. The output signal from the transistor Q-6 is taken from the collector electrode thereof and is applied to one input terminal of a 2-input terminal NAND gate 214 and to one input terminal of a conventional comparator amplifier 236.

The TRACK or CAGE signal from the switch 26 is applied through a resistor 216 and across resistor 218 to the base electrode of the NPN transistor Q-7. The emitter electrode of the transistor Q 7 is grounded and the collector electrode thereof is directly connected to a source of positive 5 volt d.c. potential through a resistor 233. The collector electrode of the transistor Q 7 is also connected to the other input terminal of the NAND gate 214 and through a diode 220 across a resistor 222 to the input terminal 224 of the amplifier 226 which supplies the V. CAGE signal at an output terminal 228 of the mode control circuit 24.

The output signal from the NAND gate 214 is applied to one input terminal of a conventional comparator amplifier 234. A constant potential is supplied to the other input terminal of the amplifier 234, to the other input terminal of the amplifier 226, and to the other input terminal of the amplifier 236 from the junction of a resistor 235 and a resistor 238 connected between a source of positive 15 volt d.c. potential and ground. The output signal from the amplifier 236 is applied to the output terminal 242 of the mode control circuit 24 as the GAIN signal and is also utilized to bias the diodes 244, 246, 248 and 250 which control the operation of the earlier described transistors FET-2 and FET-3 and a second pair of transistors FET-4 and FET-5. The transistors FET-4 and FET-5 are similarly connected to provide an R. DISC. signal on the output terminal 252 and the R. INT. signal on the output terminal 254.

In operation, the system is initially placed in the "caged" mode by the application of the CAGE signal to the transistor Q 7 which conducts to provide the V. CAGE signal, by way of the diode 220, the resistor 222 and the amplifier 226, and to provide the H. CAGE signal by way of the NAND gate 214 and the amplifier 234.

The system may be placed in the automatic "track" mode by moving the switch of FIG. 2 to the track position, thus removing the CAGE signal from the input terminal 26. The transistor Q 7 of FIG. 5 is thereby driven into cut-off and the H. CAGE and V. CAGE signals removed from the output terminals 237 and 238, respectively.

The system may be again placed in the "gate expand" mode by the depression of the joy stick button 206 of FIG. 5, thereby allowing the capacitor 208 to charge from the positive 28 volt source. The positive voltage thus developed across the capacitor 208 biases the transistor Q 6 into conduction to provide a low level signal to the NAND gate 214 which removes the H. CAGE signal on the output terminal 237. The positive voltage developed across the capacitor 208 is also applied to the amplifier 226 to provide the V. CAGE signal on the output terminal 228.

With the transistor Q 6 biased into conduction, the low level output signal is fed to the amplifier 236, which in turn biases the N-channel transistors FET-2 and FET-4 into conduction to provide the L. INT. and R. INT. signals, respectively, on the output terminal 202 and 254. At the same time, the P-channel transistors FET-3 and FET-5 are biased into cut-off to remove the L. DISC. and R. DISC. signals, respectively, from the output terminals 204 and 252.

In the "gate expand" mode, the voltage on the terminal 190 of the potentiometer 188 is fed through the FET-4 as the R. INT. signal. The wiper voltage is also inverted in the amplifier 192 and is fed through the transistor FET-2 to the output terminal 202 as the L. INT. signal. The L. INT. and R. INT. signals are used to expand the gates in the horizontal direction.

Whenever the joy stick button 206 is depressed, the output signal from the amplifier 236 is available as the GAIN signal. The GAIN signal is utilized by the trackers to control the gain of the horizontal integrators in a manner to be described.

In the system described, only the horizontal cross-hairs are caged and the system must be taken out of the track mode to expand the horizontal cross-hairs or to position the camera 16 of FIG. 2. The utilization of N-channel and P-channel field effect transistors appropriately biased through the diodes 244–250 ensures that the signals L. INT. and L. DISC. are mutually exclusive. The L. INT. and R. INT. signals are utilized, respectively, by the left tracker circuit 21 and the right tracker circuit 22 to horizontally expand the cross-hairs. Release of the joy stick button 206 and the presence of the TRACK signal reverses the state of conduction of the transistors FET-2-5 to close the tracking loop and to provide the L. DISC. and R. DISC. signals for automatic tracking.

The capacitor 208 discharges upon the release of the joy stick button 206 to close the track loop by rendering the transistor Q 6 nonconductive and thus applying a positive potential to the NAND gate 214. The discharge of the capacitor 208 also removes the signal applied to the amplifier 226 and thus removes the V. CAGE signal from the output terminal 228.

The positive potential on the collector electrode of the transistor Q 6 reverses the bias of the transistors FET-2-5 to remove the L. INT. and R. INT. signals from the output terminals 202 and 254 and to generate the L. DISC. and R. DISC. signals on the output terminals 204 and 252.

D. Tracker (C) With reference now to FIG. 6 wherein the left tracker circuit 21 of FIG. 2 is illustrated in greater detail, the tracker 21 includes a horizontal and a vertical channel. Each of the channels includes in series a ramp generator 300, a target gate circuit 302, a discriminator and error generator 304, an integrator 306, a variable monostable or one-shot multivibrator 308, a gate generator 310 and a cross-hair generator 312. The output signal from the cross-hair generators 312 in the vertical and horizontal channels are combined in an OR gate 314 and applied as the L. X-HAIR signal to the camera 16 of FIG. 2 by way of an output terminal 316. The V. CAGE signal on terminal 228 from the mode control circuit 24 of FIGS. 2 and 5 is applied to the integrator 306 in the vertical channel and the output signal therefrom applied as the L. PITCH signal to the pitch averager circuit 32 of FIG. 2 by way of an output terminal 318.

(C) Similarly, the H. CAGE signal from the mode control circuit 24 of FIG. 5 is applied by way of an input terminal 237 to the integrator 306 in the horizontal channel of FIG. 6. The integrator 306 also receives the L. INT. signal from the output terminal 202 of the mode control circuit 24 of FIG. 5. Additionally, the GAIN signal from the output terminal 242 of the mode control circuit 24 of FIG. 5 is applied by way of a gain changer circuit 322 to the integrator 306 in the horizontal channel and the output signal therefrom applied as the L. YAW signal to the yaw averager 28 of FIGS. 2 and 9 by way of output terminal 324.

(C) The L. DISC. output terminal 204 of the mode control circuit 24 of FIG. 5 is applied to the discriminator and error signal generator 304 in the horizontal channel of FIG. 6.

Figure 6:
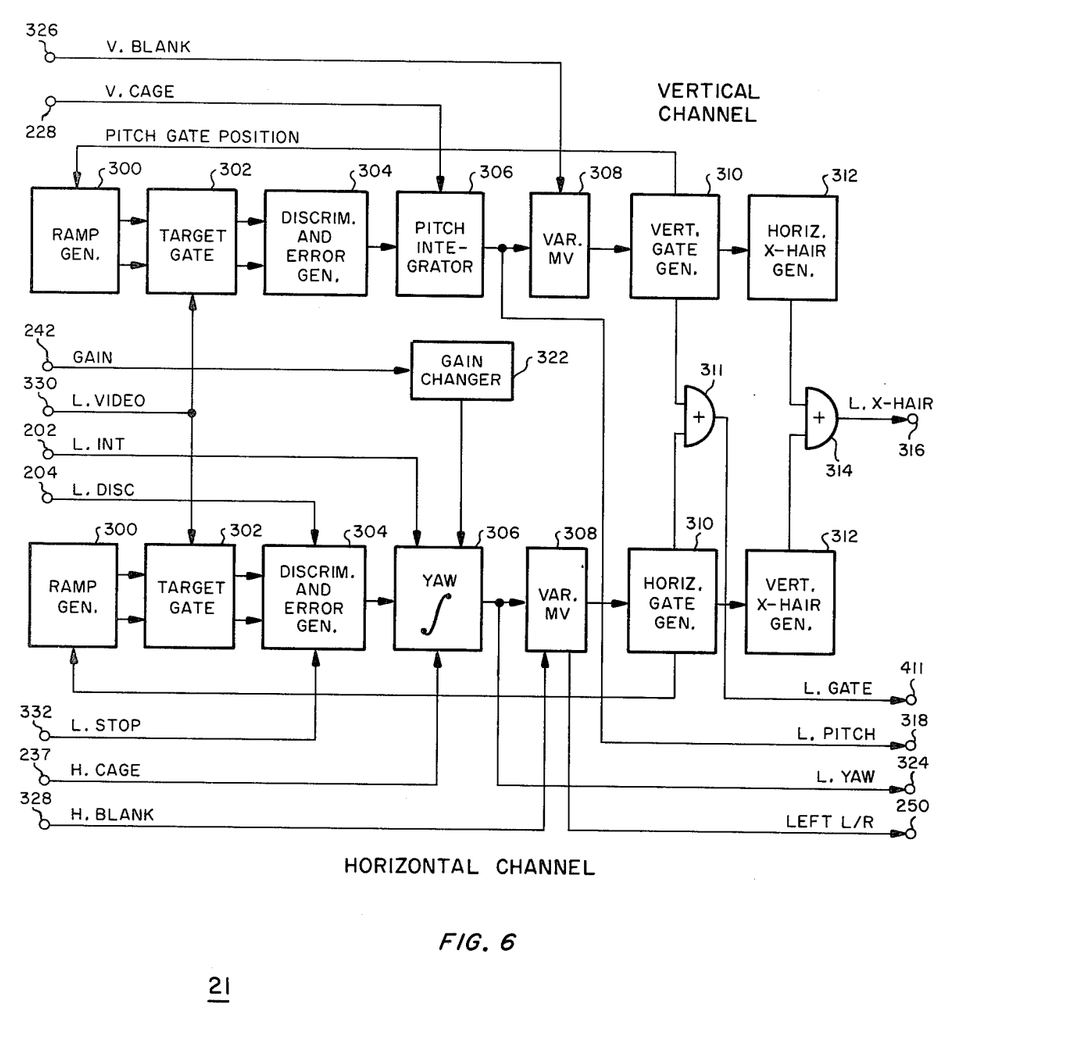
FIG. 6 is a functional block diagram of the left tracker of FIG. 2.

(C) The variable pulse width monostable multivibrator 308 in the vertical and horizontal channels of the tracker circuit receive the V. BLANK and H. BLANK signals from the camera 16 by way of respective input terminals 326 and 328. The L. VIDEO signal from the left video processor 18 of FIGS. 2 and 4 is applied by way of an input terminal 330 to the target gate circuits 302 in both the vertical and horizontal channels of the tracker 21. In addition, the L. STOP signal from the restraint circuit 36 is applied to the discriminator and error generator 304 in the horizontal channel by way of an input terminal 332. The output signal from each of the two Gate Generators 310 is combined in an OR gate 311 as shown in FIG. 6, and applied to terminal 411 as the L. GATE signal to the Left Video Processor circuit 18 of FIGS. 2 and 4.

(C) In operation, the constant amplitude negative pulses of the L. VIDEO signal are utilized to control the target gate circuits 302 and thus control the application of the negative linear ramp signal generated by the ramp generator 300 in both channels to the discriminator and error generator circuits 304 for stretching. The discriminator and error generator 304 in the vertical channel and, if enabled by the L. DISC. signal, the discriminator 304 in the horizontal channel produce an output signal which is integrated in the respective integrators 306 to provide the L. PITCH and L. YAW signals on the output terminals 318 and 324. The integrators 306 may be inhibited, respectively, by the V. CAGE and H. CAGE signals on terminals 228 and 237. The value of the output signal from the discriminator 304 in the horizontal channel is limited by the L. STOP signal. The integrator 306 in the horizontal channel may additionally be controlled by the L. INT. signal and the GAIN signal from the mode control circuit 24 when the system operator is manually positioning the gates.

(C) The horizontal channel multivibrator 308 is triggered by the H. BLANK signal to produce an output pulse having a pulse width related to the amplitude of the output signal from the yaw integrator 306. The trailing edge of this pulse corresponds to the line 50 of FIGS. 3 and 3A.

(C) Similarly, the multivibrator 308 in the vertical channel is triggered by the V. BLANK signal to produce an output pulse related in width to the amplitude of the output signal from the pitch integrator 306. The trailing edge of this pulse corresponds to the line 54 of FIGS. 3 and 3A.

(C) The variable width pulses from the multivibrators are passed, respectively, to a gate generator 310 which supplies a gate signal equal in width to the spacing between the reticles to the ramp generator 300 in the associated channel and to the cross-hair generators 312 of FIG. 6. The L. X-HAIR signal is fed back to the camera 16 for combination with the video and sync signals and display as the COMPOSITE VIDEO signal in the display 17 of FIG. 2.

Figure 7:
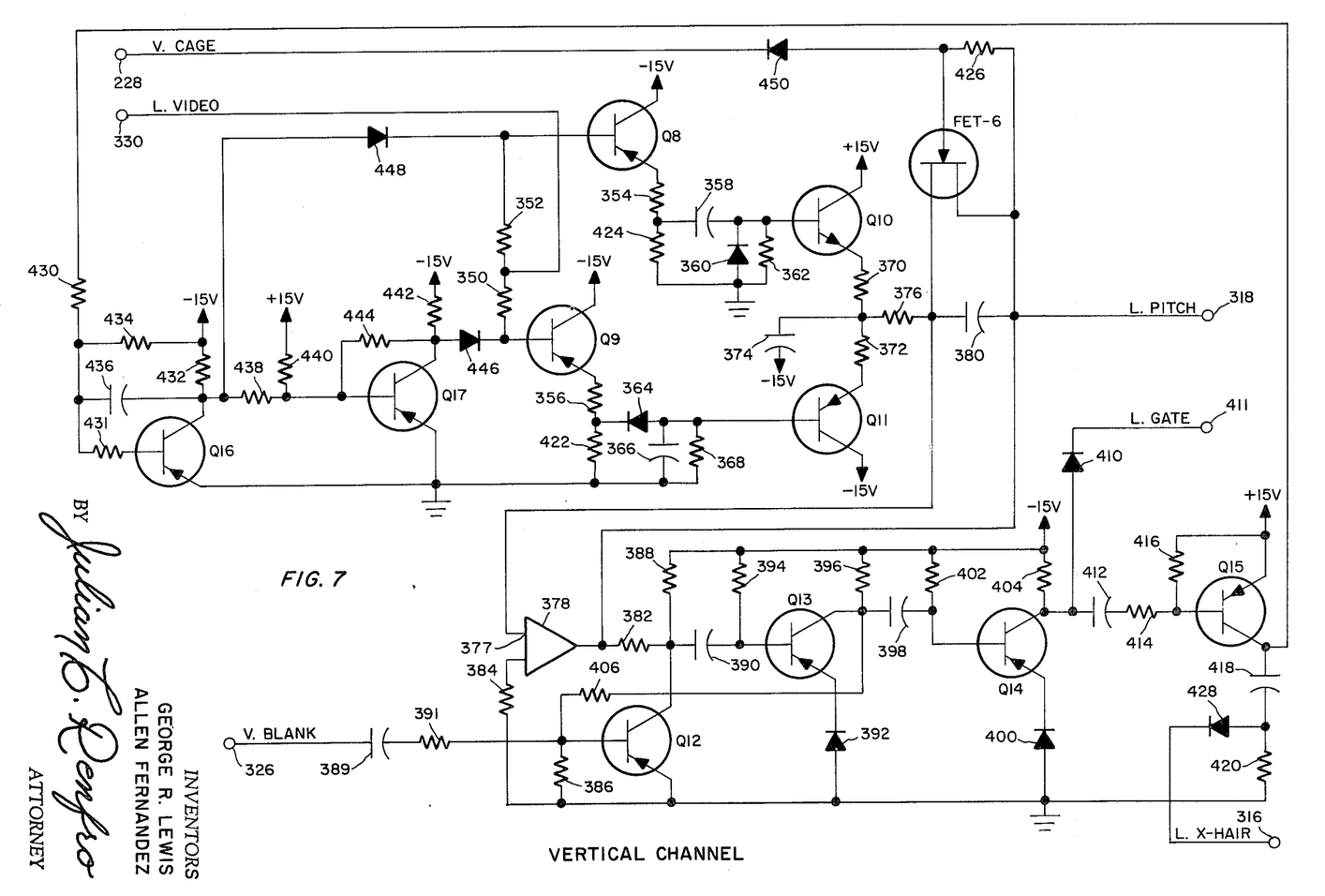
FIG. 7 is a schematic circuit diagram of the vertical channel of the tracker of FIG. 6.

(C) With reference now to FIG. 7 wherein the vertical channel illustrated in block form in FIG. 6 is illustrated in more detail, the L. VIDEO signal from the left video processor 18 is applied by way of the input terminal 330 to the resistor 350 — resistor 352 junction to the base electrodes of a pair of PNP transistors Q 8 and Q 9. The collector electrodes of the transistors Q 8 and Q 9 are directly connected to a negative source of 15 volt potential and the emitter electrodes thereof are grounded respectively through series connected resistors 354 and 424 and series connected resistors 356 and 422. The output signal of the transistors Q 8 is taken from the resistor 354 — resistor 424 junction and is applied through a capacitor 358 and across a diode 360 and a resistor 362 to the base electrode of an NPN transistor Q 10 having the collector electrode connected to a positive source of 15 volt potential.

(C) The output signal from the transistor Q 9 is similarly taken from the resistor 356 — resistor 422 and applied through a diode 364 and across a capacitor 366 and a resistor 368 in parallel to the base electrode of a PNP transistor Q 11 having the collector electrode directly connected to a negative source of 15 volt potential.

(C) The emitter electrodes of the transistors Q 10 and Q 11 are connected through resistors 370 and 372. The resistor 370 — resistor 372 junction is connected to a negative source of 15 volt potential by way of a capacitor 374 and through a resistor 376 to one input terminal 377 of a conventional operational amplifier 378.

(C) The output signal of the amplifier 378 is fed back through a capacitor 380 to the input terminal 377 and is also applied through a resistor 382 to the collector electrode of a grounded emitter PNP transistor Q 12. The amplifier 378 output signal is applied to the output terminal 318 as the L. PITCH signal. The other input terminal of the amplifier 378 is grounded through a resistor 384. Bias for the transistor Q 12 is provided by means of resistors 386 and 388.

(C) The V. BLANK signal is applied by way of an input terminal 326 to the base electrode transistor Q 12 by way of a capacitor 389 and resistor 391 and the output signal is taken from the collector electrode and applied through a capacitor 390 to the base electrode of a PNP transistor Q 13. The emitter electrode of the transistor Q 13 is grounded through a diode 392. Bias for the base and collector electrodes of the transistor Q 13 is obtained from a negative source of 15 volt potential by way of resistors 394 and 396. The output signal from the transistor Q 13 is taken from the collector electrode thereof and is applied through a capacitor 398 to the base electrode of a PNP transistor Q 14. The emitter electrode thereof is grounded through a diode 400 and bias for the base and collector electrodes is provided from a negative source of 15 volt potential by way of resistors 402 and 404. The output signal from the transistor Q 13 is also fed back to the base electrode of the transistor Q 12 by way of a resistor 406. The output signal from the transistor Q 14 is taken from the collector electrode thereof and is applied by way of one diode 410 to an output terminal 411 as the L. GATE signal. It should be mentioned that the output terminal 411 of FIG. 7 is connected directly to the output terminal 411 of the horizontal channel shown in FIG. 8. The diode 410 of FIG. 7 and the diode 520 and resistor 413 of FIG. 8 make up the OR gate 311 of FIG. 6.

Figure 8:
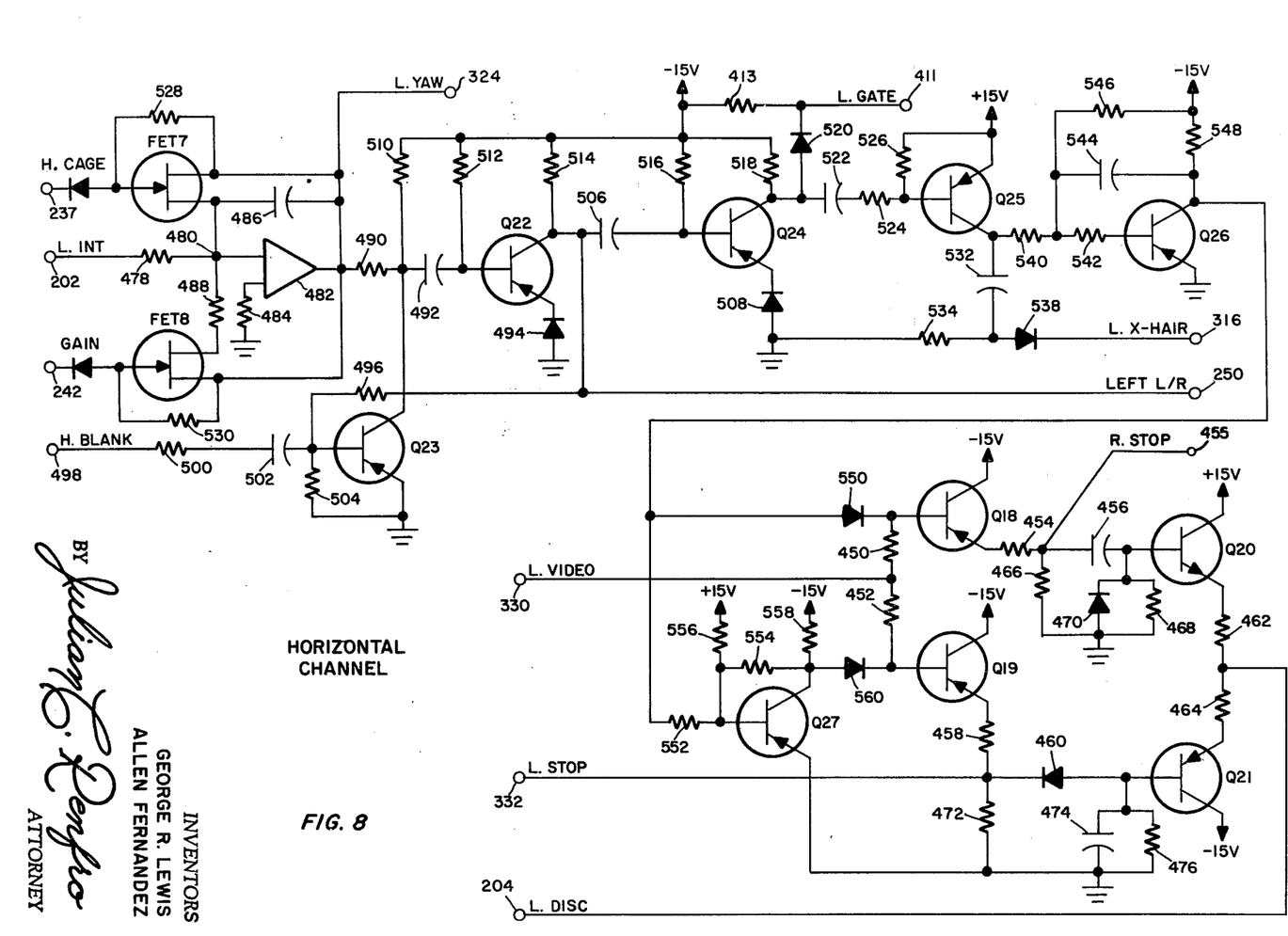
FIG. 8 is a schematic circuit diagram of the horizontal channel of the tracker of FIG. 6.

(C) The output signal from the transistor Q 14 is also applied through a capacitor 412 and a resistor 414 to the base electrode of a PNP transistor Q 15. The emitter electrode of the transistor Q 15 is directly connected to a positive source of 15 volt potential and the base electrode thereof is connected to the same source through a resistor 416. The collector electrode of the transistor Q 15 is grounded through a capacitor 418 and a resistor 420 in series. The capacitor 418 — resistor 420 junction is connected through a diode 428 to output terminal 316. The diode 428 and resistor 420 of FIG. 7 and the diode 538 of FIG. 8 are tied together to form the OR gate 314 of FIG. 6. The output of this OR gate forms the L. X-HAIR signal applied to camera 16 of FIG. 2.

(C) The output signal from the transistor Q 15 of FIG. 7 is taken from the collector electrode thereof and fed back through resistors 430 and 431 to the base electrode of a grounded emitter PNP transistor Q 16. The collector electrode of the transistor Q 16 is connected to a negative source of 15 volt potential through a resistor 432 and the base electrode thereof is connected to the same source through a resistor 434. The collector electrode is also connected by way of a capacitor 436 to the resistor 430 — resistor 431 junction. The output signal is taken from the collector electrode of the transistor Q 16 and is applied through a resistor 438 to the base electrode of a grounded emitter PNP transistor Q 17. Bias for the base and collector electrodes, respectively, of the transistor Q 17 is provided by positive and negative sources of 15 volt potential connected, respectively, through resistors 440 and 442.

(C) The output signal from the transistor Q 17 is taken from the collector electrode thereof and is fed back to the base electrode through a resistor 444. This signal is also applied through a diode 446 to the base electrode of the transistor Q 9, earlier described. The output signal from the collector electrode of the transistor Q 16 is also applied through a diode 448 to the base electrode of the transistor Q 8, earlier described.

(C) The negative V. CAGE signal is applied by way of an input terminal 228 through a diode 450 to the gate electrode of a field effect transistor FET-6 connected across the capacitor 380 in the feedback path of the operational amplifier 378. The drain electrode of the transistor FET-6 is connected through the resistor 426 to the gate electrode thereof.

(C) In operation, the conduction of the transistor FET-6 responsively to the V. CAGE signal inhibits the integration of the amplifier 378 by the removal of the capacitor 380 from the feedback path thereof. The V. BLANK signal is utilized to trigger the multivibrator 308 (transistors Q 12 and Q 13 and their associated components). The multivibrator 308 provides a pulse having a width proportional to the output signal of the integrator amplifier 378. The trailing edge of this multivibrator pulse, which coincides with line 54 of FIGS. 3 and 3A, triggers the one-shot multivibrator or gate generator 310 (transistor Q 14 and its associated components). This one-shot multivibrator in turn generates a pulse whose width is equal to the time spacing between lines 54 and 60 of FIG. 3. The output of the transistor Q 14 is coupled through an OR gate with the corresponding horizontal output of transistor Q 24 of FIG. 8 to generate an L. GATE signal.

(C) The L. GATE signal corresponds to the area inside the left gate and is employed by the left video processor circuit 18 of FIGS. 2 and 4. The L. GATE signal enables the left video processor 18 to deliver only that processed video that is inside the left gate back to the left tracker 21 as the L. VIDEO signal. The output signal of the gate generator is inverted by the transistor switch Q 15 and then differentiated by capacitor 418 and resistor 420. Only the positive going spike is passed by the diode 428. This spike is fed through the OR gate 314 of FIG. 6 with the corresponding positive going spike from the horizontal channel shown in FIG. 8 of the left tracker 21 of FIG. 2. These two spikes are applied as the L. X-HAIR signal to the TV camera 16 to effect the display of the lines 50 and 54 of FIGS. 3 and 3A.

(C) The output of Q 15 is also fed back to the input of the ramp generator consisting of transistor Q 16 and its associated components. This ramp is in turn inverted by the transistor Q 17 and its associated components. The L. VIDEO signal gate samples the ramps via the diodes 448 and 446 and the resistors 352 and 350. The portions of the ramps that are gated through the diodes 446 and 448 are pulses whose amplitudes are proportional to the error between the contrast edge inside the left gate and the center of this gate. These errors are then stretched by the transistors Q 8 and Q 9 and their associated components. The stretched pulses are then applied to the buffers Q 10 and Q 11 to generate an error to be integrated by amplifier 378.

(C) With reference now to FIG. 8 where the horizontal channel of the tracker illustrated in FIG. 6 is illustrated in greater detail, the L. VIDEO signal is applied by way of the input terminal 330 and a pair of resistors 450 and 452 to the base electrodes of a pair of PNP transistors Q 18 and Q 19 of the target gate generator 302 of FIG. 6. The collector electrodes of the transistors Q 18 and Q 19 are directly connected to a negative source of 15 volt potential and the output signals, taken from the emitter electrodes thereof, are applied, respectively, through a resistor 454 and a capacitor 456 to the base electrode of an NPN transistor Q 20 and through a resistor 458 and diode 460 to the base electrode of a PNP transistor Q 21. The collector electrodes of the transistors Q 20 and Q 21 are connected, respectively, to positive and negative sources of 15 volt potential and the emitter electrodes thereof are connected together through resistors 462 and 464. The L. DISC. output signal from the terminal 204 of the mode control circuit of FIGS. 2 and 5 is applied to the resistor 462-resistor 464 junction.

(C) The resistor 454-capacitor 456 junction is grounded by way of a resistor 466 and the base electrode of the transistor Q 20 is grounded through a resistor 468 and a diode 470 in parallel. Similarly, the resistor 458-diode 460 junction is grounded through a resistor 472 and the base electrode of the transistor Q 21 is grounded through a capacitor 474 and resistor 476 in parallel. The L. STOP signal from the restraint circuit of FIG. 10 is applied by way of an input terminal 332 to the emitter electrode of the transistor Q 19 to limit the conduction thereof.

(C) In the horizontal channel of the right tracker circuit 22 of FIG. 2, the R. STOP signal from the restraint circuit 36 is applied in FIG. 8 to the resistor 454-capacitor 456 junction 455 at the input of the transistor Q 20.

(C) With continued reference to FIG. 8, the L. INT. signal is applied by way of the output terminal 202 of the mode control circuit 24 of FIGS. 2 and 5 and a resistor 478 to one input terminal 480 of an operational amplifier 482. The other input terminal of the operational amplifier 482 is grounded through a resistor 484 and the output terminal thereof is connected by way of a feedback capacitor 486 to the input terminal 480. The capacitor 486 in the feedback path of the amplifier 482 is shunted by a field effect transistor FET-7. The gate electrode of the transistor FET-7 receives the H. CAGE signal from the output terminal 237 of the mode control circuit of FIGS. 2 and 5 via diode 527, with the connection then being made through a resistor 528 to the drain electrode thereof.

(C) The output terminal of the operational amplifier 482 is also connected through a field effect transistor FET-8 and a resistor 488 in series to the input terminal thereof. The gate and drain electrodes of the transistor FET-8 are connected through a resistor 530. The GAIN signal from the output terminal 242 of the mode control circuit 24 of FIG. 5 is transferred via diode 529 and is utilized to control the conduction of the transistor FET-8 and thus the gain of the amplifier 482.

(C) The output signal of the operational amplifier 482 is applied through a resistor 490 and a capacitor 492 to the base electrode of a PNP transistor Q 22. The emitter electrode of the transistor Q 22 is grounded through a diode 494. The output signal of the transistor Q 22 is taken from the collector electrode and is applied to the input terminal 250 of the restraint circuit 36 of FIG. 10 as the LEFT L/R signal. The output signal from the transistor Q 22 is also fed back through a resistor 496 to the base electrode of a PNP transistor Q 23. The H. BLANK signal is applied from the camera 16 by way of an input terminal 498, a resistor 500 and a capacitor 502 in series and across a resistor 504 to the base electrode of the transistor Q 23 to trigger the variable width multivibrator.

(C) The output signal LEFT L/R is also applied through a capacitor 506 to the base electrode of a PNP transistor Q 24 having the emitter electrode grounded through a diode 508. Bias for the transistors Q 22, Q 23 and Q 24 is provided from a negative source of 15 volt potential by way of resistors 510, 512, 514, 516 and 518.

(C) The output signal taken from the collector electrode of the transistor Q 24 is fed through a diode 520 to the output terminal 411 as the L. GATE signal. The transistor Q 24 output signal is also applied through a capacitor 522 and a resistor 524 in series to the base electrode of a PNP transistor Q 25. The emitter electrode of the transistor Q 25 is directly connected to a positive source of 15 volt potential and the base electrode thereof is connected to the same source through a resistor 526. The collector electrode of the transistor Q 25 is grounded through a capacitor 532 and a resistor 534 in series. The capacitor 532-resistor 534 junction is connected through diode 538 to an output terminal 316 to provide the L.X-HAIR signal. While not illustrated in FIGS. 7 and 8, the OR gate 314 of FIG. 6 is utilized to connect the respective horizontal and vertical channel L. X-HAIR signals to the indicated output terminal 316.

(C) The output signal of the transistor Q 25 is taken from the collector electrode thereof and is applied through resistors 540 and 542 to the base electrode of a grounded emitter PNP transistor Q 26. A feedback path between the collector electrode of the transistor Q 26 and the resistor 540-resistor 542 junction is provided by a capacitor 544 and the base and collector electrodes thereof are biased, respectively, from a negative source of 15 volt potential by way of resistors 546 and 548. The output signal from the transistor Q 26 is taken from the collector electrode thereof through a diode 550 to the base electrode of the transistor Q 18 earlier described and through a resistor 552 to the base electrode of a PNP transistor Q 27. A resistor 554 provides a feedback path between the collector and base electrodes of the transistor Q 27 and bias for the base and collector electrodes is provided, respectively, from positive and negative sources of 15 volt potential by way of resistors 556 and 558. The output signal of the transistor Q 27 is taken from the collector electrode thereof and is applied through a diode 560 to the base electrode of the transistor Q 19 earlier described.

(C) The operation of the horizontal channel of the tracker circuits 21 and 22 is very similar to the operation of the vertical channel earlier described in connection with FIG. 7 except for the timing which is much faster. The timing of the vertical channel may be slower to be compatible with the standard timing of the vertical television sweep rate of 60 Hz. The timing associated with the horizontal channel may be compatible with the standard timing of the horizontal television sweep rate of 15,750 Hz. With these timings, the pitch and yaw tracking rates can be made equal to each other.

(C) The basic difference between the two channels of the trackers 21 and 22 is that the horizontal channel is implemented so that the mode control circuit 24 of FIGS. 2 and 5 is able to open the horizontal channel track loop so that the pilot may manually expand the reticles in the horizontal direction to accommodate a larger target. As will be explained, the output signal L. PITCH of the left tracker pitch integrator is averaged with the output signal R. PITCH of the right tracker pitch integrator to yield an average PITCH command signal. Similarly, the output signal L. YAW of the yaw integrator of the left tracker is averaged with the output signal R. YAW of right tracker yaw integrator to yield an average YAW command signal. The optical axis of the camera, therefore, aims at the intersection of the diagonals formed by the reticles for centroid tracking. The horizontal channel of the left tracker and the horizontal channel of the right tracker are joined by the horizontal gate restraint. This feature is not shared by the vertical channels of the left and right trackers in the embodiment disclosed.

(C) The function of the horizontal gate restraint is to prevent the left tracker gate hair from crossing the right tracker gate by more than a predetermined amount, 9/10ths of a milliradian, for example, in the horizontal direction. The horizontal gate restraint also serves to prevent the gates from collapsing into a single gate when they are subjected to targets that are smaller than 1 milliradian by 1 milliradian. With range closure as the target grows, the target becomes big enough so that two distinct pulses are generated by the video processors, the leftmost pulse will be tracked by the left tracker and the rightmost pulse will be tracked by the right tracker.

E. Averager (U)

(U) With reference to the yaw averager 28 of FIG. 2, illustrated in greater detail in FIG. 9, the circuit illustrated may be utilized as well for the pitch averager 32 of FIG. 2 which will not be additionally described.

(U) The L. YAW signal from the output terminal 324 of the left tracker circuit 21 of FIGS. 2 and 6 is applied through a resistor 334 to an input terminal 336 of a conventional operational amplifier 338. The R. YAW signal from the output terminal 340 of the right tracker circuit 22 of FIG. 2 is applied through a resistor 342 to the input terminal 336.

(U) The input terminal 336 is grounded through a resistor 344, and the other input terminal 346 of the amplifier 338 is grounded through a resistor 347. The output signal of the amplifier 338 is fed back to the input terminal 346 through a resistor 348 and is also applied to the circuit output terminal 30 as the YAW signal.

(U) In operation, the L. YAW and R. YAW signals are summed as one input signal to the amplifier 338 and one-half of the amplifier output signal is fed back to the other input terminal to be subtracted from the sum of the L. YAW and R. YAW signals. The amplitude and sign of the YAW signal may then be utilized for the desired control function.

F. Restraint

With reference now to FIG. 10 wherein the restraint circuit 36 of FIG. 2 is illustrated in greater detail, the LEFT L/R and RIGHT L/R signals are applied respectively to the input terminals 250 and 252 from the left and right tracker circuits 21 and 22 of FIG. 2. The input terminals 250 and 252 are connected respectively to the base electrodes of PNP transistors Q8 and Q9 arranged in a common collector configuration. The emitter electrodes of the transistors Q8 and Q9 are grounded respectively through resistors 254 and 256.

The output signal from the transistor Q8 is taken from the emitter electrode thereof and applied through a resistor 258 to the base electrode of a grounded emitter NPN transistor Q10. The base electrode of the transistor Q10 is biased from a source of positive 15 volt d.c. potential by way of a resistor 260, and the output signal is taken from the collector electrode thereof and applied to the input terminal of a conventional monostable circuit or one-shot multivibrator 263. The true output terminal of the one-shot multivibrator 262 is connected to one input terminal 264 of a NAND gate 266.

The output signal taken from the emitter electrode of the transistor Q9 is applied through a resistor 268 to the base electrode of a grounded emitter NPN transistor Q11. The base electrode of the transistor Q11 is biased from a positive 15 volt source of d.c. potential through a resistor 270, and the collector electrode is biased through a resistor 272 from a source of positive 5 volt d.c. potential. The output signal from the transistor Q11 is taken from the collector electrode thereof and applied to the other input terminal 274 of the NAND gate 266.

The output signal from the NAND gate 266 is applied to the input terminal of a monostable circuit or one-shot multivibrator 276 and the true output terminal thereof is connected through a capacitor 278 to the base electrode of an NPN transistor Q 12. The emitter electrode of the transistor Q 12 is grounded through a resistor 280 and is connected through a diode 282 to a negative source of 15 volt potential which also provides bias for the base electrode of the transistor Q 12 through a resistor 284. The collector electrode of the transistor Q 12 is connected through a resistor 286 to the base electrode of a pair of PNP transistors Q 13 and Q 14 connected in a common collector configuration. The collector electrodes of the transistors Q 13 and Q 14 are connected to a negative source of 15 volt potential and the emitter electrode of the transistor Q 13 is connected through a resistor 288 to the output terminal 332 of the restraint circuit 36 to provide the L. STOP signal. Similarly, the emitter electrode of the transistor Q 14 is connected through a resistor 292 to the output terminal 294 of the restraint circuit 36 to provide the R. STOP signal.

In operation, the leading edge of the LEFT L/R signal from the left tracker circuit 21 is coupled through the emitter follower Q 8 and the switch Q 10 to trigger the one-shot multivibrator 262. The multivibrator 262 pulse width is equal to the minimum gate separation represented by the separation of the lines 50 and 62 of FIG. 3A. If the LEFT L/R and the RIGHT L/R signal from the right tracker circuit 22 overlap, the NAND gate 266 will produce a signal which triggers the multivibrator 276. The width of the multivibrator 276 pulse is equal to the separation between the lines 62 and 58 of FIG. 3A. This signal effects the conduction of the transistors Q 12, Q 13 and Q 14. Thus, the L. STOP signal biases the left gate to the left and the R. STOP signal biases the right gate to the right to prevent overlapping by more than the minimum desired gate separation.

ADVANTAGES AND SCOPE OF THE INVENTION

From the foregoing, it is apparent that the method and system of the present invention has utility in a wide range of applications in which the advantage of control rather than edge tracking is desired. The tracking signals may be utilized as error signals in a wide range of positioning systems such as, but not limited to, the missile control system described.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus comprising:
   means for producing a transduced electrical signature of an optical image of a target within a field of view;
   first detector means for detecting a first edge of the optical image of the target;
   second detector means for detecting a second edge of the optical image of the target;
   target center detector means responsive to said first and second detector means for detecting a point on the target between the detected edges thereof; and
   means responsive to said target center detector means for generating an electrical error signal related to the departure of the detected target center from the center of the field of view.

2. The apparatus of claim 1 including means for preventing said first and second detector means from detecting the same edge of the optical image of the target.

3. The apparatus of claim 2 wherein said electronic signature producing means includes a television camera and wherein said first and second edges are horizontal edges.

4. The apparatus of claim 2 wherein said each of first and second detector means generates an electrical edge signal related to the departure of the respectively detected edges from the center of the field of view; and wherein said target center detector means includes an operational amplifier for averaging said edge signals.

5. The apparatus of claim 2 including display means for displaying an optical image of the target within the field of view in response to said electronic signature;

means for generating an optical reticle on the display; and manually operable means for positioning the reticle with respect to the field of view.

6. The apparatus of claim 5 including means for selectively expanding said optical reticle.

7. The apparatus of claim 6 wherein said means for producing a transduced electrical signature includes a television camera;

wherein said first and second edges are horizontal; and wherein said optical reticle is horizontally expandable.

8. The apparatus of claim 1 wherein said electronic signature producing means includes a television camera.

9. The apparatus of claim 1 including display means for displaying an optical image of the target within the field of view in response to said electronic signature;

means for generating an optical reticle on the display; and manually operable means for positioning the reticle with respect to the field of view.

10. The apparatus of claim 9 wherein said optical reticle is horizontally expandable.

11. The apparatus of claim 1 wherein said each of first and second detector means generates an electrical edge signal related to the departure of the respectively detected edges from the center of the field of view; and wherein said target center detector means includes an operational amplifier for averaging said edge signals.

* * * * *